(12) United States Patent
Lin

(10) Patent No.: US 7,986,470 B2
(45) Date of Patent: Jul. 26, 2011

(54) APERTURE STOP AND LENS MODULE

(75) Inventor: Hou-Yao Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/718,085

(22) Filed: Mar. 5, 2010

(65) Prior Publication Data

US 2011/0116177 A1 May 19, 2011

(30) Foreign Application Priority Data

Nov. 17, 2009 (CN) .......................... 2009 1 0309847

(51) Int. Cl.
*G02B 9/00* (2006.01)
(52) U.S. Cl. ....................................... 359/740; 359/739
(58) Field of Classification Search ........... 359/738–740
See application file for complete search history.

(56) References Cited

FOREIGN PATENT DOCUMENTS

JP 2005227500 A * 8/2005

* cited by examiner

*Primary Examiner* — William C Choi
(74) *Attorney, Agent, or Firm* — Raymond J. Chew

(57) ABSTRACT

An annular aperture stop includes a first annular portion and a second annular portion. The first annular portion extends and slowly tapers towards the center of the aperture stop. The second annular portion extends inwards from the first portion and sharply tapers off to the innermost boundary of the aperture stop and defines a tapering angle. The radial thickness of the second portion is smaller than a predetermined tolerance of about 0.035 mm of the inner diameter of the aperture stop. The tapering angle is smaller than a predetermined threshold of about 70 degrees, whereby the innermost boundary of the aperture stop is protected from flashes during molding the aperture stop.

10 Claims, 2 Drawing Sheets

APERTURE STOP AND LENS MODULE

BACKGROUND

1. Technical Field

The present disclosure relates to lens modules and, particularly, to an aperture stop and a lens module.

2. Description of Related Art

Commonly, the effectiveness of apertures for lens modules is determined by the inner diameter of aperture stops. Injection molding is often used to form the aperture stops. It is difficult to precisely mold such aperture stops and an extremely high molding pressure is required to mold the aperture stops. This can cause a plurality of deformations that can interfere with performance of the aperture stops.

Therefore, it is desirable to provide an aperture stop and a lens module, which can overcome the abovementioned limitations.

BRIEF DESCRIPTION OF THE DRAWINGS

Many aspects of the present aperture stop and lens module should be better understood with reference to the following drawings. The components in the drawings are not necessarily drawn to scale, the emphasis instead being placed upon clearly illustrating the principles of the present aperture stop and the lens module. Moreover, in the drawings, like reference numerals designate corresponding parts throughout the several views.

DETAILED DESCRIPTION

Embodiments of the present aperture stop and lens module will now be described in detail with reference to the drawings.

Figure 1:
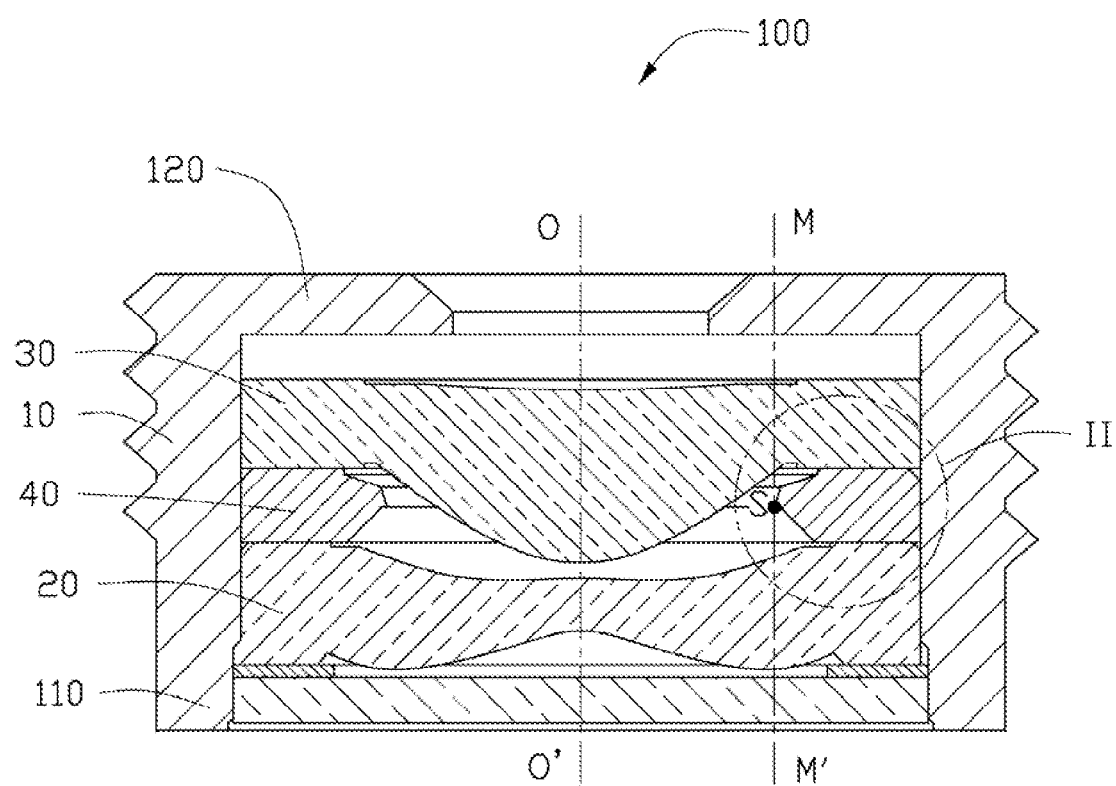
FIG. 1 is cross-sectional view of a lens module, according to an exemplary embodiment.

Referring to FIG. 1, a lens module 100, according to an exemplary embodiment, includes a lens barrel 10.

Arranged in the lens barrel 10 in the following order from an object-side end 120 to an image-side end 110 of the lens barrel 10 are a first lens 20, an aperture stop 40, and a second lens 30. The first lens 20 and the second lens 30 cooperatively define a common optical axis OO' of the lens module 100.

Figure 2:
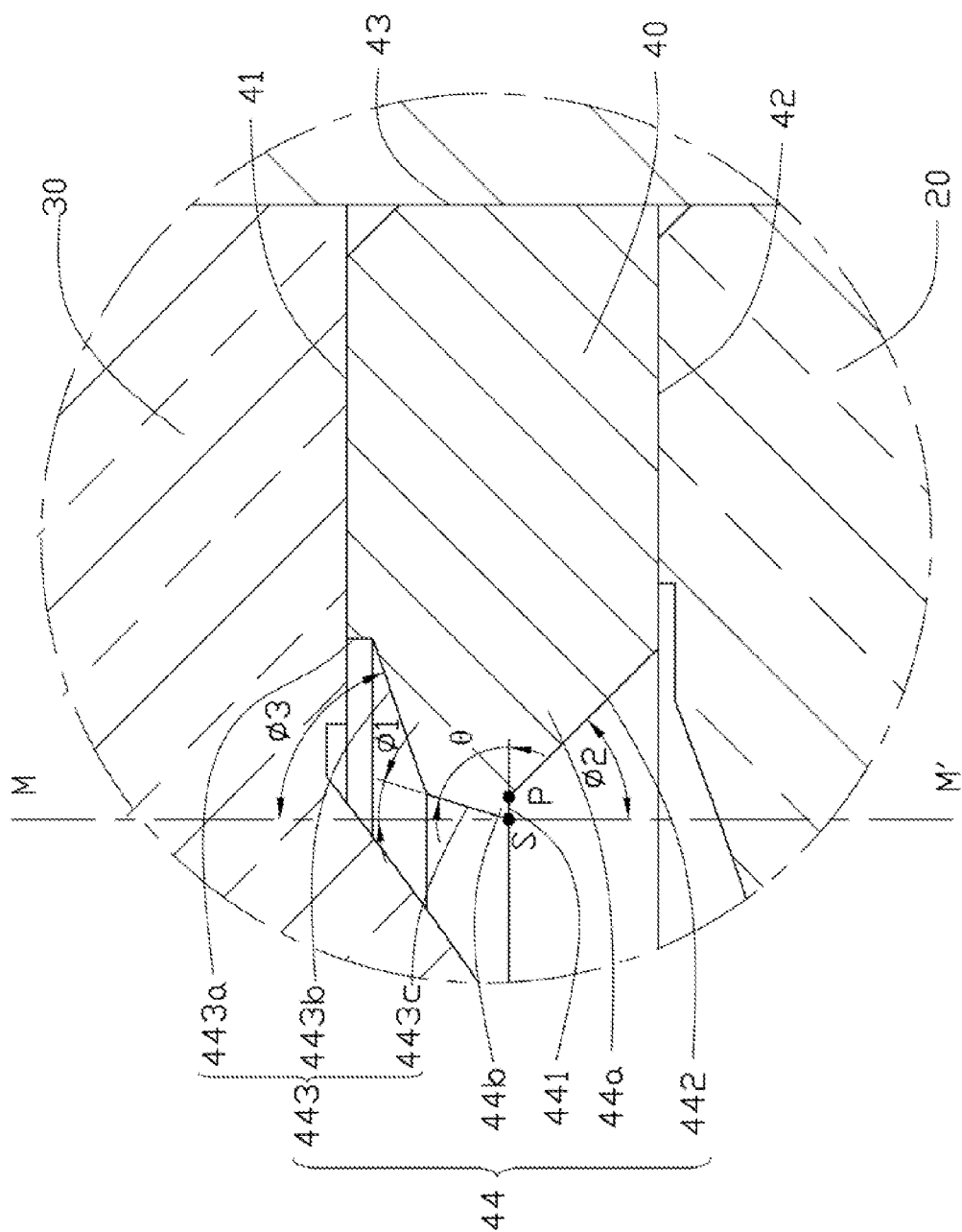
FIG. 2 is enlarged cross-sectional view of portion II of FIG. 1.

Referring to FIG. 2, the aperture stop 40 includes a first surface 41, a second surface 42 parallel and opposite to the first surface 41, an outer surface 43 perpendicularly connecting the first surface 41 and the second surface 42, and an inner surface 44 opposite to the outer surface 43. The first surface 41 is adjacent to the object-side end 120 of the lens barrel 10 and contacts the second lens 30. The second surface 42 is adjacent to the image-side end 110 of the lens barrel 10 and contacts the first lens 20. The outer surface 43 contacts the lens barrel 10.

The aperture stop 40 defines an innermost vertex S and a connecting point P between the innermost vertex S and the outer surface 43. The inner surface 44 includes a first portion 441, a second portion 442, and a third portion 443. The first portion 441 extends from the innermost vertex S towards the outer surface 43 to the connecting point P and is parallel to the first surface 441 or the second surface 442. An orthogonal projection of the first portion 441 onto the outer surface 43 is located between the first surface 41 and the second surface 42. The second portion 442 connects the second surface 42 to the innermost vertex S (i.e., the first portion 441). The third portion 443 connects the first surface 41 to the connecting point P (i.e., the first portion 441).

The third portion 443 includes a first sub-portion 443a, a second sub-portion 443b, and a third sub-portion 443c. The first sub-portion 443a connects to the first surface 41 and perpendicularly extends toward the second surface 42 from the first surface 41. The second sub-portion 443b extends from the first sub-portion 443a towards the innermost vertex S and the second surface 42 with a small inclined angle. The third sub-portion 443c extends from the second sub-portion 443b to the innermost vertex S with a large inclined angle (equating to the tapering angle θ).

The second portion 442 and the second sub-portion 443b cooperatively form a slowly tapering portion 44a therebetween. The first portion 441 and the third sub-portion 443c cooperatively form a sharply tapering portion 44b therebetween. The slowly tapering portion 44a extends and tapers towards the center of the aperture stop 40. The sharply tapering portion 44b extends inwards from the slowly tapering portion 44a and tapers off to the innermost vertex S.

It should be understood that, in FIGS. 1-2, only a cross section of the lens module 100 passing the optical axis OO' is shown. The actual lens module 100 and components thereof such as the lens barrel 10, the first lens 20, the second lens 30, and the aperture stop 40 are substantially annular and symmetrical about the optical axis OO' (that is, the center of the aperture stop 40 coincides with the optical axis OO'). All the surfaces, portions, sub-portions, and points described above, such as, the surfaces 41, 42, 43, 44, the portions 441, 442, 443, the sub-portions 443a, 443b, 443c, the innermost vertex S, and the connecting point P, encircle and are substantially symmetrical about the optical axis OO'. The innermost vertex S forms the innermost boundary of the aperture stop 40.

The tapering angle θ of the sharply tapering portion 44b (i.e., the included angle between the first portion 441 and the third portion 443) is smaller than a predetermined threshold, whereby the innermost boundary of the aperture stop 40 is protected from flashes, e.g. burrs, formed during the molding procedure of the aperture stop 40. The radial thickness of the sharply tapering portion 44b (i.e. the length of the first portion 441 on the diameter of the aperture stop 40) is smaller than a predetermined tolerance level of the inner diameter of the aperture stop 40. As such, the precision of the inner diameter of the aperture stop 40 can be controlled within the tolerance level even though voids are formed in the sharply tapering portion 44b.

In this embodiment, the tapering angle θ is limited to a range from about 60 degrees to about 70 degrees (i.e., the predetermined threshold is about 70 degrees). Accordingly, the included angle Φ1 between the third sub-portion 443c and the optical axis OO' (in FIG. 2, the optical axis OO' is translated to a line MM') is limited to a range of about 20 to about 30 degrees. The radial thickness is limited to a range of about 0.025 millimeters (mm) to about 0.035 mm (i.e., the tolerance level of the inner diameter of the aperture stop 40 is about 0.035 mm).

To limit voids being formed in the intersection between the second surface 42 and the second portion 442 during the molding procedure of the aperture stop 40 (i.e., the connecting point P), the included angle Φ2 between the second portion 442 and the optical axis OO' is limited to a range from about 40 to about 60 degrees.

It should be understood that, the first sub-portion 443a that is extending perpendicularly from the first surface 41 is beneficial for preventing too many flashes being formed at the intersection between the first sub-portion 443a and the first surface 41. To avoid flashes forming at the intersection of the first sub-portion 443a and the second sub-portion 443b from extending over the first surface 41, the height H of the first sub-portion 443a is larger than about 0.03 mm.

To avoid too many flashes being formed at the intersection between the second sub-portion 443b and the third sub-portion 443c, the included angle Φ3 between the second sub-portion 443b and the optical axis OO' is limited to a range from about 60 to 70 degrees. That is, the small inclined angle is in a range from about 10 to 20 degrees.

It is noteworthy that the configuration of the slowly tapering portion 44a and the sharply tapering portion 44b are not limited to this embodiment. Any portion that extends and slowly tapers toward the center of the aperture stop can function as the slowly tapering portion. Any portion that extends inwards from the slowly tapering portion and sharply tapers off to the innermost boundary of the aperture stop can function as the sharply tapering portion.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An aperture stop comprising:
a first annular portion extending and slowly tapering towards the center of the aperture stop; and
a second annular portion extending inwards from the first portion and sharply tapering off to the innermost boundary of the aperture stop and defining a tapering angle; the radial thickness of the second annular portion being smaller than a predetermined tolerance of about 0.035 millimeters of the inner diameter of the aperture stop; the tapering angle being smaller than a predetermined threshold of about 70 degrees.

2. The aperture stop of claim 1, wherein the radial thickness of the second annular portion is in a range from about 0.025 to about 0.035 millimeters.

3. The aperture stop of claim 1, wherein the tapering angle is in a range from about 60 to about 70 degrees.

4. The aperture stop of claim 1, further comprising a first surface, a second surface parallel and opposite to the first surface, an outer surface connecting the first surface and the second surface, and an inner surface opposite to the outer surface, the inner surface being formed by the first annular portion and the second annular portion.

5. The aperture stop of claim 4, wherein the inner surface comprises an innermost vertex, a connecting point between the innermost vertex and the outer surface, a first portion extending from the innermost vertex to the connecting point along a direction parallel to the first surface, a second portion connecting the second surface to the connecting point, and a third portion connecting the first surface to the innermost vertex; the innermost vertex forming the innermost boundary of the aperture stop.

6. The aperture stop of claim 5, wherein the third portion comprises a first sub-portion perpendicularly extending from the first surface toward the second surface, a second sub-portion extending from an end of the first sub-portion far away from the first surface towards the center of the aperture stop and inclined relative to the second surface by a first inclined angle, and a third sub-portion extending from an end of the second sub-portion far away from the first sub-portion to the innermost vertex and inclined relative to the second surface by a second inclined angle.

7. The aperture stop of claim 6, wherein the second sub-portion and the second portion form the first annular portion, and the third sub-portion and the first portion form the second annular portion.

8. The aperture stop of claim 6, wherein the first inclined angle is smaller than the second inclined angle.

9. The aperture stop of claim 6, wherein the length of the first sub-portion in the thickness direction of the aperture stop is larger than 0.003 millimeters.

10. The aperture stop of claim 6, wherein the first inclined angle is in a range from about 10 to about 20 degrees.

* * * * *